US012743892B2

(12) United States Patent
Ozawa et al.

(10) Patent No.: US 12,743,892 B2
(45) Date of Patent: Sep. 22, 2026

(54) SYSTEMS AND METHODS FOR IDENTIFYING MISSING VEHICLES AND PEOPLE UTILIZING VEHICLE'S ONBOARD CAMERA IMAGES AND DATA

(71) Applicant: Adeia Guides Inc., San Jose, CA (US)

(72) Inventors: Toshiro Ozawa, Irvine, CA (US); Jean-Yves Couleaud, Mission Viejo, CA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 168 days.

(21) Appl. No.: 18/883,127

(22) Filed: Sep. 12, 2024

(65) Prior Publication Data

US 2026/0073705 A1 Mar. 12, 2026

(51) Int. Cl.
*G06V 20/58* (2022.01)

(52) U.S. Cl.
CPC .................................... *G06V 20/58* (2022.01)

(58) Field of Classification Search
CPC ...................................................... G06V 20/58
See application file for complete search history.

(56) References Cited

U.S. PATENT DOCUMENTS 8,345,098 B2 1/2013 Grigsby et al.
8,836,784 B2 9/2014 Erhardt et al.
9,858,817 B1 1/2018 Bletzer et al.
11,222,219 B2 1/2022 Lund et al.
11,853,926 B1 * 12/2023 Jones .................... G06V 20/60
12,315,352 B1 * 5/2025 Smith .................... G06V 40/16
2024/0419429 A1 * 12/2024 Mesde ...................... G06F 8/60
2025/0225821 A1 * 7/2025 Majerus ................ G07C 5/008

OTHER PUBLICATIONS

Tesla's Full Self-Driving Overview (https://www.tesla.com/full-self-driving), 10 pages., Jan. 22, 2025.
U.S. Appl. No. 18/802,849, Title: Environment-Responsive Control and Projection of Images for Vehicles, filed Aug. 13, 2024.
U.S. Appl. No. 18/882,564, Title: Systems and Methods for Utilizing Onboard Vehicle Hardware for Compute Tasks in a Cloud Computing Environment, filed Sep. 11, 2024.
(Continued)

*Primary Examiner* — Dave Czekaj
(74) *Attorney, Agent, or Firm* — HG LAW LLP

(57) ABSTRACT

Systems and methods are provided herein for using data collected by vehicles to complete tasks. For example, a service provider may receive a request for information related to a missing vehicle. The request may also include characteristics (e.g., license plate number, make, model, color, year, last-known location, etc.) related to the missing vehicle. The service provider may generate an agent associated with the request and send the agent to a plurality of vehicles. The plurality of vehicles may use sensors (e.g., cameras), the agent, and the characteristics of the missing vehicle, to identify information (e.g., images) relating to the missing vehicle. The plurality of vehicles may then send the information (e.g., images) relating to the missing vehicle to the service provider and the service provider generates a report using the received information.

20 Claims, 10 Drawing Sheets

(56) References Cited

OTHER PUBLICATIONS

Waymo, “Waymo Driver”, available online at: <https://waymo.com/waymo-driver/>, retrieved on Oct. 2, 2024, 8 pages.

Wikipedia, “Amber alert”, available online at: <https://en.wikipedia.org/wiki/ Amber_alert#Texas_program_development>, retrieved on Oct. 2, 2024, 11 pages.

Wikipedia, “GasBuddy”, available online at: <https://en.wikipedia.org/wiki/GasBuddy> retrieved on Oct. 2, 2024, 3 pages.

* cited by examiner

200

SYSTEMS AND METHODS FOR IDENTIFYING MISSING VEHICLES AND PEOPLE UTILIZING VEHICLE'S ONBOARD CAMERA IMAGES AND DATA

BACKGROUND

The present disclosure relates to a system that can dynamically configure and update client devices (e.g., implemented at vehicle computer systems) to carry out specific tasks leveraging, e.g., the ability of one or more vehicles to detect or collect various data (e.g., image/video data, audio data, radar/lidar data, in-cabin monitoring data, vehicle telematics data, etc.). For example, a vehicle may be tasked with facilitating the identification of a missing vehicle or person, facilitating the identification of optimal gas stations or charge stations, facilitating the management of a rider-sharing vehicle or fleet, facilitating operations carried out by delivery vehicles, or facilitating the management of autonomous vehicles or vehicle fleets.

SUMMARY

Incidents involving missing people or missing vehicles continue to present a significant challenge for law enforcement agencies, search and rescue teams, and the general public. Traditional search methods often rely on manual efforts, such as physical searches, broadcasting alerts, and reviewing security footage. Such manual efforts can be time-consuming and labor-intensive. The traditional search methods also often suffer from delays in receiving critical information and the inability to collect relevant data across vast areas. As a result, the traditional search process is often inefficient, leading to prolonged recovery times and reduced chances of successful recoveries. In view of these deficiencies, there exists a need for an innovative solution that can leverage advancements in data collection to streamline the process of searching for missing people or missing vehicles.

Accordingly, techniques are disclosed herein for leveraging data collected by vehicles to assist with finding a missing person or a missing vehicle. For example, a service provider may receive a request for information related to a missing vehicle from a first device. The first device may be associated with an emergency service account (e.g., law enforcement, firefighter, medical, etc.). The first device may submit the request for information related to the missing vehicle to one or more servers related to the service provider. The request may include characteristics (e.g., license plate number, make, model, color, year, last-known location, etc.) related to the missing vehicle. The service provider may then transmit a notification to a first vehicle. The notification may indicate a task (e.g., obtain image of the missing vehicle) related to the request.

In response to the notification from the service provider, the first vehicle may request one or more agents associated with the request. An agent may be one or more pieces of software generated to perform a task or one or more portions of the task. In some embodiments, the service provider has access to a plurality of agents wherein each agent of the plurality of agents is associated with a different task and/or a different portion of a task. The service provider may identify a first agent related to the request. For example, the first agent may include an image processing algorithm trained using pictures of vehicles. The service provider may then transmit the agent to the first vehicle to be executed by the first vehicle's operating system. In some embodiments, different agents of the plurality of agents are unique to different vehicle operating systems. The service provider may identify the first agent because the first agent is related to the request and because the first agent is compatible with the first vehicle's operating system. For example, the first vehicle may be a Tesla and the first agent may be compatible with a Tesla operating system, while a second agent is not selected because the second agent is compatible with a Honda operating system.

After downloading the first agent, the first vehicle may capture a plurality of images. The first vehicle may capture the plurality of images using one or more sensors (e.g., optical sensors, depth sensors, ultra sonic sensors, Infrared (IR) cameras, Red Green Blue (RGB) cameras, Passive IR (PIR) cameras, heat IR sensors, tension sensors, audio sensors, and/or any combination thereof). For example, the first vehicle may capture a plurality of images using a first camera attached to the first vehicle's windshield. As the first vehicle captures the plurality of images, the first agent may analyze each of the captured images. The first agent may use an image processing algorithm and characteristics associated with the missing vehicle to determine if any of the captured images comprise a depiction of the missing vehicle. In response to the first agent detecting that a first image comprises a depiction of the missing vehicle, the first vehicle may transmit the first image to the service provider. The first vehicle may also include metadata related to the first image. For example, the metadata may include time of day, location, and/or similar such information related to the first image. The first vehicle and/or the first agent may repeat this process until the task is completed and/or until the agent is removed.

The service provider may confirm whether the first image is associated with the task. For example, the service provider may use an image processing algorithm and characteristics associated with the missing vehicle to determine if the first image comprises a depiction of the missing vehicle. If the service provider confirms that the first image is associated with the task, then the service provider may transmit the first image along with any corresponding metadata to the first device. The service provider may repeat this process for multiple images received from one or more vehicles. Once the task is complete, the service provider may transmit an additional notification to the first vehicle. The additional notification may indicate that the task (e.g., obtain image of the missing vehicle) related to the request is completed. In response to the additional notification, the first vehicle may remove the first agent from the operating system of the first vehicle.

In some embodiments, the same or similar methodology may be implemented in response to a request related to a missing person. For example, the request may include characteristics (e.g., age, ethnicity, gender, height, weight, last-known location, etc.) related to the missing person. The service provider may then transmit a notification to one or more vehicles (e.g., the first vehicle) indicating the task (e.g., obtain image of the missing person) related to the request. One or more vehicles (e.g., the first vehicle) may download one or more agents related to the request and use the agents to identify images related to the request. The identified images are then sent to the service provider where the service provider transmits the identified images and corresponding metadata to the necessary emergency service account.

In some embodiments, the same or similar methodology may be implemented in response to a request for information related to one or more locations. For example, a first task related to a request may be to obtain images of gas prices at gas stations. The request may include characteristics (e.g., locations, parameters, time frames, etc.) related to the gas stations. The service provider may then transmit a notification to one or more vehicles (e.g., the first vehicle) indicating the task (e.g., obtain images of gas prices at gas stations) related to the request. One or more vehicles (e.g., the first vehicle) may download one or more agents related to the request and use the agents to identify images related to the request. The identified images are then sent to the service provider where the service provider transmits the identified images and corresponding metadata to the requester of the gas prices (e.g., a gas price application). In another example, a first task related to a request may be to obtain images of a delivered package at a delivery location. The request may include characteristics (e.g., locations, parameters, time frames, etc.) related to one or more deliveries. The service provider may then transmit a notification to one or more vehicles (e.g., the first vehicle) indicating the task (e.g., obtain images of a delivered package at a delivery location) related to the request. One or more vehicles (e.g., the first vehicle) may download one or more agents related to the request and use the agents to identify images related to the request. The identified images are then sent to the service provider where the service provider transmits the identified images and corresponding metadata to a delivery service.

In some embodiments, the same or similar methodology may be implemented in response to a request for information related to a rideshare application. For example, a first task related to a request may be to obtain video of rideshare vehicle's point of view (POV). The request may include conditions (e.g., distance from user, time period threshold, etc.) related to when the video is to be captured and transmitted. The service provider may then transmit a notification to one or more vehicles (e.g., the rideshare vehicle) indicating the task (e.g., obtain video of the rideshare vehicle's POV when certain conditions are met) related to the request. One or more vehicles (e.g., the rideshare vehicle) may download one or more agents related to the request and use the agents to obtain video of rideshare vehicle's POV when the conditions are met. The video may then be sent to the service provider where the service provider transmits the video and corresponding metadata to the rideshare application so a user can view the video and more easily find their rideshare driver.

In some embodiments, the same or similar methodology may be implemented in response to a request for information related to a car accident. For example, a first task related to a request may be to obtain images of a car accident. The request may include conditions (e.g., impact sensor threshold, airbag activation, acceleration sensor threshold, etc.) related to when the images are to be captured and transmitted. The service provider may then transmit a notification to one or more vehicles (e.g., the first vehicle) indicating the task (e.g., capture images when certain conditions are met) related to the request. One or more vehicles (e.g., the first vehicle) may download one or more agents related to the request and use the agents to obtain images of a car accident when the conditions are met (e.g., airbag activation). The images may then be sent to the service provider where the service provider transmits the images to an insurance provider.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
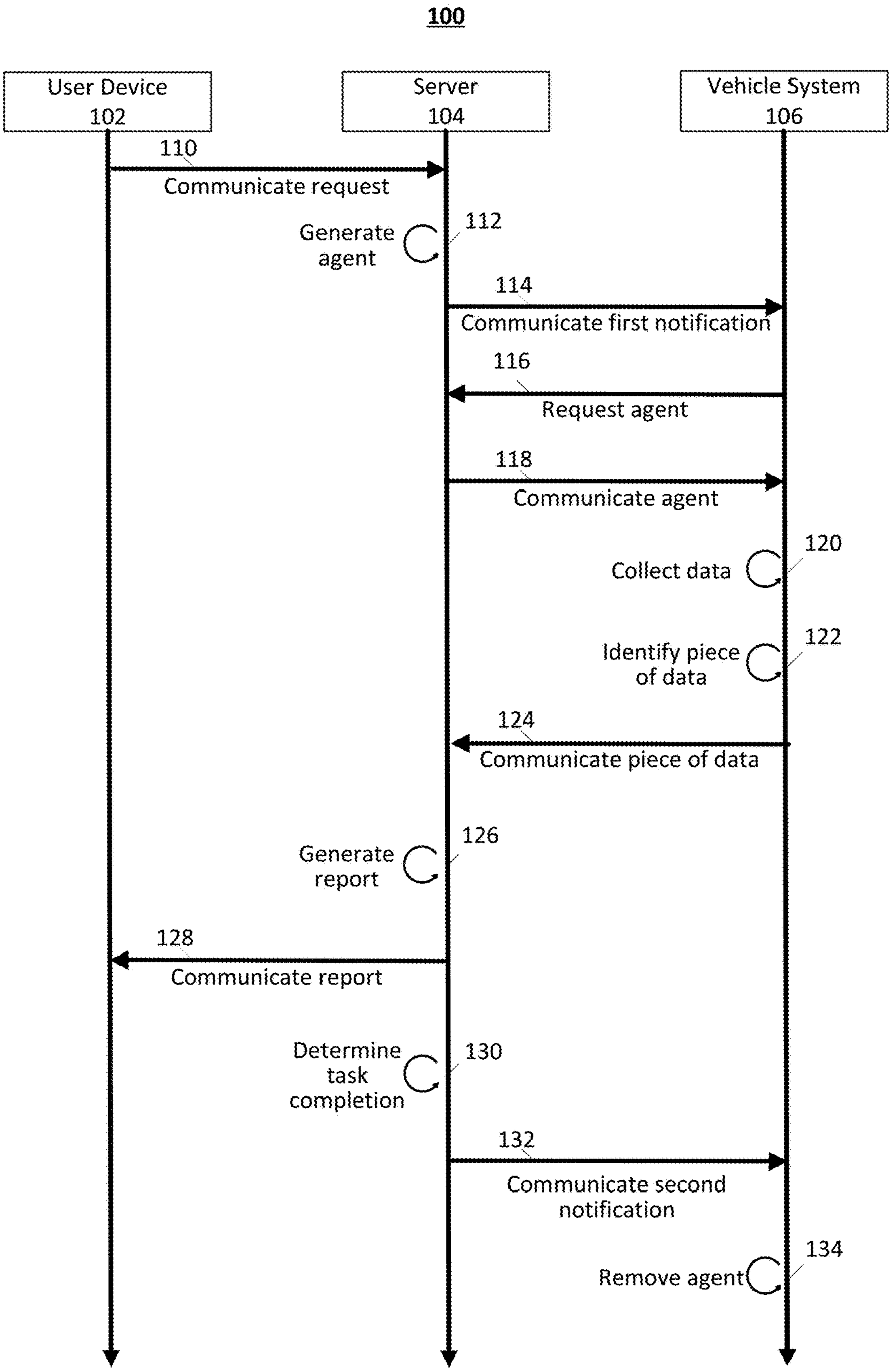
FIG. 1 shows an illustrative flowchart of a process for using data collected by vehicles to complete tasks, in accordance with some embodiments of the disclosure.

FIG. 1 shows an illustrative flowchart of a process 100 for using data collected by vehicles to complete tasks, in accordance with some embodiments of the disclosure. In some embodiments, some steps of the process 100 may be performed by one of several devices. Although a user device 102, a server 104, and a vehicle system 106 are shown, any number of servers and/or devices may be used. Further, different devices may perform different steps of the process 100 than what is shown. Although the process 100 is illustrated and described as a sequence of steps, it is contemplated that various embodiments of the process 100 may be performed in any order or combination and need not include all the illustrated steps. In some embodiments, the user device 102 is a smartphone, laptop, desktop, and/or similar such device. The user device 102 may be associated with an emergency service account (e.g., law enforcement, firefighter, medical, etc.).

At step 110, the user device 102 communicates a request to the server 104. In some embodiments, the user device 102 uses one or more communication networks to transmit the request to the server 104. The request may comprise one or more tasks. For example, a task may be to obtain data related to a missing vehicle. In another example, the task may be to obtain data related to a missing person. In some embodiments, the request also comprises information about the one or more tasks. For example, if the task relates to obtaining data related to a missing vehicle, then the request may comprise characteristics (e.g., license plate number, make, model, color, year, last-known location, etc.) related to the missing vehicle. In another example, if the task relates to obtaining data related to a missing person, then the request may comprise characteristics (e.g., age, ethnicity, gender, height, weight, last-known location, etc.) related to the missing person. In another example, if the task relates to obtaining data related to one or more locations, then the request may comprise characteristics (e.g., coordinates, location type, etc.) related to the one or more locations.

At step 112, the server 104 generates an agent related to the request. As described above, an agent may be one or more pieces of software generated to perform a task or one or more portions of the task. In some embodiments, the server 104 generates an agent by selecting an agent from a plurality of agents. For example, the server 104 may have access to one or more agent databases comprising a plurality of agents and selects a first agent of the plurality of agents based on the request. In some embodiments, each agent of the plurality of agents is associated with a task type. For example, a first set of agents may be associated with missing vehicle tasks and a second set of agents may be associated with missing people tasks. In another example, a first set of agents may be associated with image recognition tasks and a second set of agents may be associated with audio processing tasks. The server 104 may identify a first agent of the plurality of agents related to the request. For example, the first agent may include an image processing algorithm trained using pictures of vehicles.

In some embodiments, the server 104 generates an agent by customizing one or more agents of the plurality of agents based on the request. For example, the request may comprise a first task (e.g., obtain data related to a missing vehicle) and a first set of characteristics (e.g., license plate of the missing vehicle) related to the task. The server 104 may identify a first agent of the plurality of agents because the first agent has an attribute (e.g., the first agent comprises an image processing algorithm trained using pictures of license plates) corresponding to the first task and/or characteristics. The server 104 may then input the first set of characteristics (e.g., license plate of the missing vehicle) into the first agent to generate the agent associated with the request.

In some embodiments, the server 104 generates more than one agent and/or more than one version of an agent to support different types of vehicle operating systems. For example, the request may comprise a first task (e.g., obtain data related to a missing vehicle) and a first set of characteristics (e.g., license plate of the missing vehicle) related to the task. The server 104 may identify a first agent that is both compatible with a Tesla operating system and comprises an image processing algorithm trained using pictures of license plates. The server 104 may also identify a second agent that is both compatible with a Honda operating system and comprises an image processing algorithm trained using pictures of license plates. The server 104 may identify both the first agent and the second agent as relating to the request.

At step 114, the server 104 communicates a first notification to the vehicle system 106. In some embodiments, the server 104 uses one or more communication networks to transmit the first notification to the vehicle system 106. The first notification may indicate a task (e.g., obtain image of a missing vehicle) related to the request. In some embodiments, the first notification also comprises a task identifier related to the task.

In some embodiments, the sever 104 communicates the first notification to the vehicle system 106 because the vehicle system 106 is a target vehicle. The server 104 may identify target vehicles based on one or more attributes of the target vehicles and/or the request. For example, if the request is for data related to a missing person with a first characteristic (e.g., last seen in Denver, Colorado) then the server 104 may identify vehicles with a first attribute (e.g., within 50 miles of Denver, Colorado) as target vehicles.

In some embodiments, the sever 104 identifies target vehicles based on one or more vehicle systems registering with the server 104. For example, the vehicle system 106 may register with the server 104 prior to step 110. In another example, the vehicle system 106 may register with the server prior to step 114. In some embodiments, the one or more vehicle systems transmits attributes and/or vehicle identifiers associated with the vehicle systems when the vehicle systems register with the server 104. For example, the vehicle system 106 may register with the server 104 and transmit a first attribute (e.g., rideshare vehicle, location information, etc.) associated with the vehicle system 106. In another example, the vehicle system 106 may register with the server 104 and transmit a vehicle identifier (e.g., vehicle operating software type, one or more sensor type, etc.) associated with the vehicle system 106. The server may use the information received from the vehicle systems to identify target vehicles related to one or more requests.

At step 116, the vehicle system 106 requests the agent from the server 104. In some embodiments, the vehicle system 106 requests the agent by transmitting a request to the server 104. The request may comprise one or more identifiers (e.g., task identifier) related to the first notification. In some embodiments, the request also comprises one or more identifiers (e.g., make, model, vehicle operating software type, etc.) related to the vehicle system.

At step 118, the server 104 communicates the agent to the vehicle system 106. In some embodiments, the server communicates the agent that was generated at step 112. In some embodiments, the server 104 uses one or more communication networks to transmit the agent to the vehicle system 106. In some embodiments, the server 104 communicates the agent to the vehicle system 106 by sending a location identifier (e.g., URL, file location, etc.) where the agent is located and the vehicle system 106 uses the location identifier to retrieve the agent. In some embodiments, the server 104 identifies the agent based on the request at step 116 and/or an attribute of the vehicle system 106. For example, the request may comprise one or more identifiers (e.g., task identifier) associated with the agent, and the server 104 uses the one or more identifiers to identify the correct agent for the vehicle system. In another example, the request may comprise one or more identifiers (e.g., task identifier) associated with the agent and a vehicle identifier (e.g., vehicle operating software type). The server 104 may use both the one or more identifiers associated with the request and the vehicle identifier to identify the correct agent for the vehicle system.

At step 120, the vehicle system 106 collects data. The vehicle system 106 may collect the data (e.g., image/video data, audio data, radar/lidar data, in-cabin monitoring data, vehicle telematics data, etc.) using one or more sensors (e.g., optical sensors, depth sensors, ultra sonic sensors, IR cameras, RGB cameras, PIR cameras, heat IR sensors, tension sensors, audio sensors, etc.).

At step 122, the vehicle system 106 identifies a piece of data. In some embodiments, the vehicle uses the agent to identify the piece of data. In some embodiments, the vehicle system 106 collects data using the same or similar methodologies used during normal vehicle operation and the agent analyzes the data being collected. For example, the vehicle system 106 may capture a plurality of images using a camera attached to a windshield of the vehicle system 106. As the vehicle system 106 captures the plurality of images, the agent may analyze each of the captured images. The agent may use an image processing algorithm and characteristics (e.g., license plate) associated with the task (e.g., obtain data related to a missing vehicle) to determine a piece of data (e.g., an image comprising a depiction of the missing vehicle) related to the task.

At step 124, the vehicle system 106 communicates the piece of data to the server 104. In some embodiments, the vehicle system 106 also communicates metadata related to the piece of data to the server. For example, the metadata may include time of day, location, and/or similar such information related to the piece of data. In some embodiments, the vehicle system 106 and/or the agent may repeat steps 120-124 until the task is completed. For example, the vehicle system 106 and/or the agent may repeat steps 120-124 until the vehicle system 106 receives a second notification (e.g., step 132) from the server 104. In another example, the vehicle system 106 and/or the agent may repeat steps 120-124 until a time limit (e.g., two weeks) associated with the request and/or the agent. In another example, the vehicle system 106 and/or the agent may repeat steps 120-124 until the agent is removed or deleted.

At step 126, the server 104 generates a report. In some embodiments, the report comprises the piece of data received at step 124 and/or metadata related to the piece of data. For example, the report may comprise an image comprising a depiction of the missing vehicle received from the vehicle system 106 and the location where the image was captured. In some embodiments, the server 104 confirms whether the piece of data received from the vehicle system 106 is associated with the task. For example, the server 104 may use an image processing algorithm and characteristics associated with the missing vehicle to determine if the image received from the vehicle system 106 comprises a depiction of the missing vehicle.

In some embodiments, the report comprises data received from a plurality of vehicle systems. For example, a first vehicle system (e.g., vehicle system 106) may transmit a first image comprising a depiction of the missing vehicle to the server 104 and a second vehicle system may transmit a second image comprising a depiction of the missing vehicle to the server 104. The generated report may comprise the first image and the second image. At step 128, the server 104 communicates the report to the user device 102.

At step 130, the server 104 determines that the task is complete. In some embodiments, the server 104 determines that the task is complete in response to receiving the piece of data from the vehicle system 106 at step 124. In some embodiments, the server 104 determines that the task is complete in response to communicating the report to the user device 102 at step 128. In some embodiments, the server 104 determines that the task is complete in response to one or more thresholds related to the task. For example, the request may have a time limit (e.g., two weeks) associated with the task. In some embodiments, the server 104 determines that the task is complete in response to receiving a message from the user device 102. For example, the user device 102 may send a request termination message to the server 104.

At step 132, the server 104 communicates a second notification to the vehicle system 106. In some embodiments, the server 104 uses one or more communication networks to transmit the second notification to the vehicle system 106. The second notification may indicate that the task related to the request is complete. In some embodiments, the second notification also comprises a task identifier related to the task. In some embodiments, the sever 104 communicates the second notification to one or more vehicle systems that received the first notification at step 114. At step 134, the vehicle system 106 removes the agent. In some embodiments, the vehicle system 106 removes the agent by removing the agent from an operating system of the vehicle system 106.

Although tasks associated with finding missing people and/or missing vehicles are described, the same of similar methodologies of the process 100 may be used for other tasks. For example, the request at step 110 may comprise a task to obtain data related to one or more locations (e.g., gas stations). The request may comprise characteristics (e.g., coordinates, parameters, time frames, etc.) related to the one or more locations. For example, the request may comprise a task to obtain pictures of gas prices advertised at gas stations. The request may also comprise the coordinates of a plurality of gas stations. The server 104 may then generate one or more agents related to the request at step 112. For example, the server 104 may generate one or more agents and/or one or more versions of an agent including an Optical Character Recognition (OCR) program for detecting gas prices depicted in images. The server 104 may then communicate a first notification to one or more vehicles of a plurality of target vehicles at step 114. For example, the task may request gas prices within San Diego, California and the server 104 may identify vehicles with a first attribute (e.g., within San Diego, California) as target vehicles. In response to the notifications, the one or more vehicles of a plurality of target vehicles may then request the agent related to the task at step 116 and the server 104 communicates the one or more generated agents to the one or more vehicles of a plurality of target vehicles at step 118.

The vehicle system 106 may then collect data at step 120 and identify a piece of data related to the task at step 122. For example, the vehicle system 106 may capture a plurality of images using a camera attached to a windshield of the vehicle system 106. As the vehicle system 106 captures the plurality of images, the agent may use an OCR program on the captured images to determine a first piece of data (e.g., a gas price) related to the task to obtain advertised gas prices in San Diego, California. The vehicle system 106 may communicate the first piece of data (e.g., a gas price) to the server 104 at step 124. In some embodiments, the vehicle system 106 and/or the agent may repeat steps 120-124, until the task is completed. At step 126, the server 104 may generate a report comprising the piece of data received from the vehicle system 106 and/or metadata related to the piece of data. For example, the report may comprise a first advertised gas price received from the vehicle system 106 as well as the location where and/or time of day when the advertised gas price was detected. At step 128, the server 104 may then communicate the report to the device that communicated the request. The server 104 may then determine that the task is complete at step 130 and then communicate a second notification to the one or more vehicles of a plurality of target vehicles at step 132. The vehicles that received the agent may then remove the agent from their operating systems.

In another example, the request at step 110 may comprise a task to obtain one or more pictures of a delivered item (e.g., to obtain proof of delivery). The request may also comprise the coordinates and/or time frames related to the deliveries. The server 104 may then generate one or more agents related to the request at step 112. For example, the server 104 may generate one or more agents and/or one or more versions of an agent including an image processing algorithm trained using pictures of deliveries. The server 104 may then communicate a first notification to one or more vehicles of a plurality of target vehicles at step 114. For example, the task may be for delivery vehicles associated with a first attribute (e.g., Amazon vehicles) and so the server 104 may identify vehicles with the first attribute (e.g., Amazon vehicles) as target vehicles. In response to the notifications, the one or more vehicles of a plurality of target vehicles may then request the agent related to the task at step 116, and the server 104 communicates the one or more generated agents to the one or more vehicles of a plurality of target vehicles at step 118.

The vehicle system 106 may then collect data at step 120 and identify a piece of data related to the task at step 122. For example, the vehicle system 106 may capture a plurality of images using a camera attached to a windshield of the vehicle system 106. As the vehicle system 106 captures the plurality of images, the agent may use an image processing algorithm trained using pictures of deliveries to identify images depicting delivered items. In another example, the vehicle system 106 may capture a plurality of images using a camera attached to a windshield of the vehicle system 106 and the agent may have access to location information. Using the location information the agent may determine that the vehicle system 106 is at a first delivery location. The agent may then identify one or more images taken by the vehicle system 106 when the vehicle system 106 is at the first delivery location and/or as the vehicle system 106 is leaving the first delivery location. The vehicle system 106 may communicate the first piece of data (e.g., image depicting the delivered item) to the server 104 at step 124. In some embodiments, the vehicle system 106 and/or the agent may repeat steps 120-124, until the task is completed.

At step 126, the server 104 may generate a report comprising the piece of data received from the vehicle system 106 and/or metadata related to the piece of data. For example, the report may comprise images of delivered items and the time of day when the images were captured by the vehicle system 106. At step 128, the server 104 may then communicate the report to the device that communicated the request. The server 104 may then determine that the task is complete at step 130 and then communicate a second notification to the one or more vehicles of a plurality of target vehicles at step 132. The vehicles that received the agent may then remove the agent from their operating systems. In some embodiments, the agent may not be removed from the operating software of the vehicle system 106. For example, an entity (e.g., Amazon) may want all their fleet vehicles to comprise the agent related to the task for all deliveries.

In another example, the request at step 110 may comprise a task to obtain data related to the vehicle system 106 and conditions related to the task. For example, the task related to a request may be to obtain video of rideshare vehicle's point of view (POV) and/or the rideshare vehicle's location. The request may include conditions (e.g., distance from user, time period threshold, etc.) related to when to obtain the data related to vehicle system 106. The server 104 may then generate one or more agents related to the request at step 112. For example, the server 104 may generate one or more agents programed to capture vehicle data (e.g., video captured from a dashboard camera of the vehicle system 106, position data related to the vehicle system 106, etc.) in response to one or more conditions (e.g., distance from user, time period threshold, etc.). The server 104 may then communicate a first notification to one or more vehicles of a plurality of target vehicles at step 114. For example, the task may be for vehicles associated with a first attribute (e.g., rideshare vehicles) and so the server 104 may identify vehicles with the first attribute (e.g., Uber vehicles) as target vehicles. In response to the notifications, the one or more vehicles of a plurality of target vehicles may then request the agent related to the task at step 116, and the server 104 communicates the one or more generated agents to the one or more vehicles of a plurality of target vehicles at step 118.

The vehicle system 106 may then collect data at step 120, and identify a piece of data related to the task at step 122 when a condition is met. For example, the vehicle system 106 may capture a video using a dashboard camera of the vehicle system 106. If the vehicle system 106 is within a threshold distance (e.g., 150 feet) of the user, then the agent may identify the portion of the video when the vehicle system 106 is within the threshold distance (e.g., 150 feet) of the user. In another example, the vehicle system 106 may be generating location data (e.g., the coordinates of the vehicle system 106). If the vehicle system 106 determines that a threshold time (e.g., ten minutes) has elapsed since a user has requested a ride using a rideshare application, then the agent may identify the coordinates of the vehicle system 106. The vehicle system 106 may communicate the piece of data (e.g., portion of the video, the coordinates of the vehicle system 106, etc.) associated with the condition to the server 104 at step 124.

In some embodiments, the vehicle system 106 and/or the agent may repeat steps 120-124, until the task is completed. At step 126, the server 104 may generate a report comprising the piece of data received from the vehicle system 106 and/or metadata related to the piece of data. For example, the report may comprise the portion of the video captured after the vehicle system 106 is within the threshold distance (e.g., 150 feet) of the user. In some embodiments, the portion of the video is a live stream that is transmitted until the vehicle system 106 determines that the user has been picked up. In another example, the report may comprise the coordinates of the vehicle system 106 recorded after a threshold time (e.g., ten minutes) has elapsed since the user has requested a ride using the rideshare app. In some embodiments, the coordinates of the vehicle system 106 are continuously transmitted until the vehicle system 106 determines that the user has been picked up.

At step 128, the server 104 may then communicate the report to the device that communicated the request. In some embodiments, the server 104 communicates the report to one or more additional devices as indicated by the request. For example, the server 104 may transmit the report to a second server (e.g., ride share server) associated with the request. The second server may then transmit the report and/or portions of the report to a client device (e.g., device of the rideshare customer associated with the vehicle system 106). In another example, the server 104 may transmit the report and/or portions of the report directly to a client device (e.g., device of the rideshare customer associated with the vehicle system 106) associated with the vehicle system 106 and/or the request. The server 104 may then determine that the task is complete at step 130, and then communicate a second notification to the one or more vehicles of a plurality of target vehicles at step 132. The vehicles that received the agent may then remove the agent from their operating systems. In some embodiments, the agent may not be removed until after one or more conditions are met. For example, an entity (e.g., Uber) may want all vehicles to comprise the agent related to the task while the vehicles are in the process of working. The agent may be removed from the operating system of one or more vehicles once the vehicles are no longer providing rides for the rideshare application.

In some embodiments, the request may comprise a task corresponding to obtaining video of the inside of the cabin of the vehicle system 106 during a rideshare. For example, a rideshare company may want video of the inside of the vehicle to identify driver and/or rider inappropriate behavior. The request may include conditions (e.g., when a rider enters the cabin of the vehicle) related to when to obtain video of the inside of the cabin of the vehicle system 106. The server 104 may generate one or more agents related to the request. For example, the server 104 may generate one or more agents programed to capture video of the inside of the cabin of the vehicle system 106 in response to detecting a rider inside the cabin of the vehicle system 106. The server 104 may then communicate a first notification to the vehicle system 106. For example, the task may be for vehicles associated with a first attribute (e.g., rideshare vehicles, Uber vehicles, Lyft vehicles, etc.) and the server 104 may identify vehicles with the first attribute (e.g., Uber vehicles) as target vehicles. In response to the notifications, the vehicle system 106 may request the agent related to the task and the server 104 may communicate the one or more generated agents to the vehicle system 106.

The vehicle system 106 may then collect data and identify a piece of data related to the task when the condition is met. For example, the vehicle system 106 may capture a video of the inside of the cabin of the vehicle system 106. If the agent detects that a rider has entered the cabin of the vehicle system 106, then the agent may identify a portion of the video associated with the time period when the rider entered the cabin of the vehicle system 106 until the rider exited the cabin of the vehicle system 106. The vehicle system 106 may communicate the portion of the video associated with time period when the rider entered the cabin of the vehicle system 106 until the rider exited the cabin of the vehicle system to the server 104. In some embodiments, the server 104 and/or the vehicle system 106 obscures, blurs, and/or removes, part of the video that displays the face of the rider and/or the driver. For example, the agent may use a facial recognition algorithm to detect the face of the rider in the portion of the video. In such an example, the agent may blur the face of the rider before transmitting the portion of the video to the server 104. In another example, the agent may use location-based-information (e.g., the driver is located in the front of the vehicle and the rider is located in the back of the vehicle) associated with the portion of the video to determine which rider's face should be obscured. In such an example, the agent may blur the face of the rider because the rider is located in the back of the vehicle.

In some embodiments, the server 104 and/or the vehicle system 106 transmits and/or obscures part of the video based on one or more policies related to the task. For example, some rideshare applications allow multiple users to share a single vehicle. A first policy may indicate that parts of a video that display the face of a first user should be altered before the video is sent to a second user. In some embodiments, the agent may use a facial recognition algorithm to detect the face of the first rider in a portion of the video and may blur the face of the first rider before transmitting the portion of the video to the second user. A second policy may indicate that a video that displays a first user should not be transmitted to a second user until the second user is located within the vehicle. In some embodiments, the agent refrains from transmitting the video to the second user until the agent detects the second user in the vehicle.

In another example, the request at step 110 may comprise a task to obtain data related to the vehicle system 106 and conditions related to the task. For example, the task related to a request may be to obtain images captured by a vehicle system 106 and/or vehicle diagnostics. The request may include conditions (e.g., when a car accident occurs) related to when to obtain the data related to the vehicle system 106. The server 104 may then generate one or more agents related to the request at step 112. For example, the server 104 may generate one or more agents including an image processing algorithm trained using pictures of car accidents. In another example, the server 104 may generate one or more agents with software programmed to capture data based on one or more pieces of vehicle information (e.g., impact sensor detecting an impact above a threshold, airbag activation, acceleration sensor detecting an acceleration above a threshold, brake pedal input, gas pedal input, steering wheel input, seat belt tension input, etc.). The server 104 may then communicate a first notification to one or more vehicles of a plurality of target vehicles at step 114. In response to the notifications, the one or more vehicles of a plurality of target vehicles may then request the agent related to the task at step 116, and the server 104 communicates the one or more generated agents to the one or more vehicles of a plurality of target vehicles at step 118.

The vehicle system 106 may then collect data at step 120, and identify a piece of data related to the task at step 122 when a condition is met. For example, the vehicle system 106 may capture a plurality of images using one or more cameras. The agent may use an image processing algorithm trained using pictures of car accidents to determine a piece of data (e.g., an image comprising a depiction of the car accident) related to the task. In another example, the vehicle system 106 may be generating vehicle information (e.g., acceleration data). When the vehicle system 106 generates acceleration data that exceeds a threshold, then the agent may determine that a car accident has occurred and record data (e.g., images captured, acceleration data generated, impact sensor data generated, velocity data generated, brake pedal data generated, gas pedal data generated, steering wheel data generated, seat belt tension data generated, etc.) generated before, during, and/or after the detection of the car accident. The vehicle system 106 may communicate the piece of data (e.g., an image comprising a depiction of the car accident, acceleration data generated, impact sensor data generated, velocity data generated, etc.) associated with the condition to the server 104 at step 124. In some embodiments, the agent is also instructed to contact emergency services in response to detecting a car accident.

In some embodiments, the vehicle system 106 and/or the agent may repeat steps 120-124, until the task is completed. At step 126, the server 104 may generate a report comprising the piece of data received from the vehicle system 106 and/or metadata related to the piece of data. For example, the report may comprise images/video comprising a depiction of the car accident, acceleration data generated, impact sensor data generated, velocity data generated, and/or similar such information. At step 128, the server 104 may then communicate the report to the device that communicated the request. The server 104 may then determine that the task is complete at step 130, and then communicate a second notification to the one or more vehicles of a plurality of target vehicles at step 132. The vehicles that received the agent may then remove the agent from their operating systems.

Figure 2:
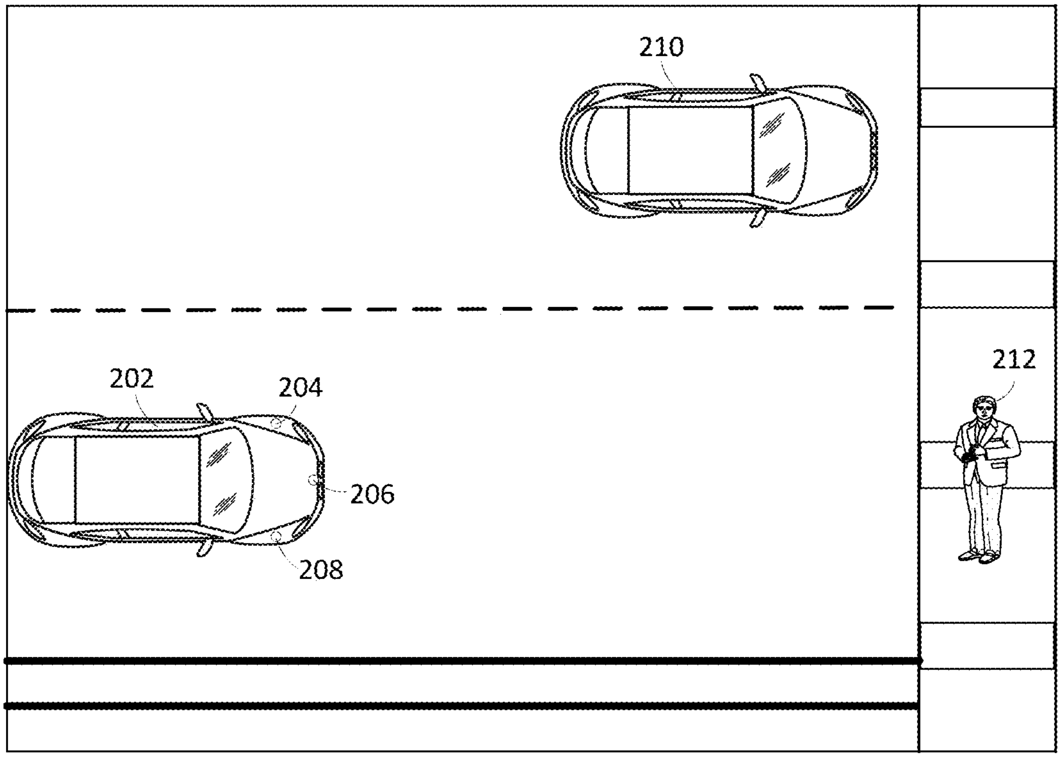
FIG. 2 shows an illustrative diagram of a system for using data collected by vehicles to complete tasks, in accordance with embodiments of the disclosure.

FIG. 2 shows an illustrative diagram of a system 200 for using data collected by vehicles to complete tasks, in accordance with embodiments of the disclosure. In some embodiments, the system 200 comprises a vehicle system 202 comprising a first camera 204, a second camera 206, a third camera 208, and one or more agents. Although three cameras are shown, any number of cameras and/or additional sensors may be used. In some embodiments, the one or more agents correspond to a task. For example, the task may be to obtain data related to a missing vehicle. The agent may have access to characteristics (e.g., make, model, color, year, last-known location, license plate number, etc.) related to the missing vehicle of the task. In another example, the task may be to obtain data related to a missing person. The agent may have access to characteristics (e.g., age, ethnicity, gender, height, weight, last-known location, etc.) related to the missing person.

In some embodiments, the agent analyzes data collected by sensors of the vehicle system 202. For example, the vehicle system 202 may collect a first plurality of images using the first camera 204 and a second plurality of images using the second camera 206. As the vehicle system 202 captures the plurality of images, the agent may analyze each of the captured images. In response to the agent detecting that one or more images of the plurality of images corresponds to the task, the agent may transmit the one or more detected images to a server (e.g., server 104). For example, if the agent detects that an image depicts a second vehicle 210 and the second vehicle 210 satisfies one or more characteristics of the missing vehicle identified by the task, then the agent may transmit the image to the server. In another example, if the agent detects that an image depicts a person 212 and the person 212 satisfies one or more characteristics of the missing person identified by the task, then the agent may transmit the image to the server.

Figure 3:
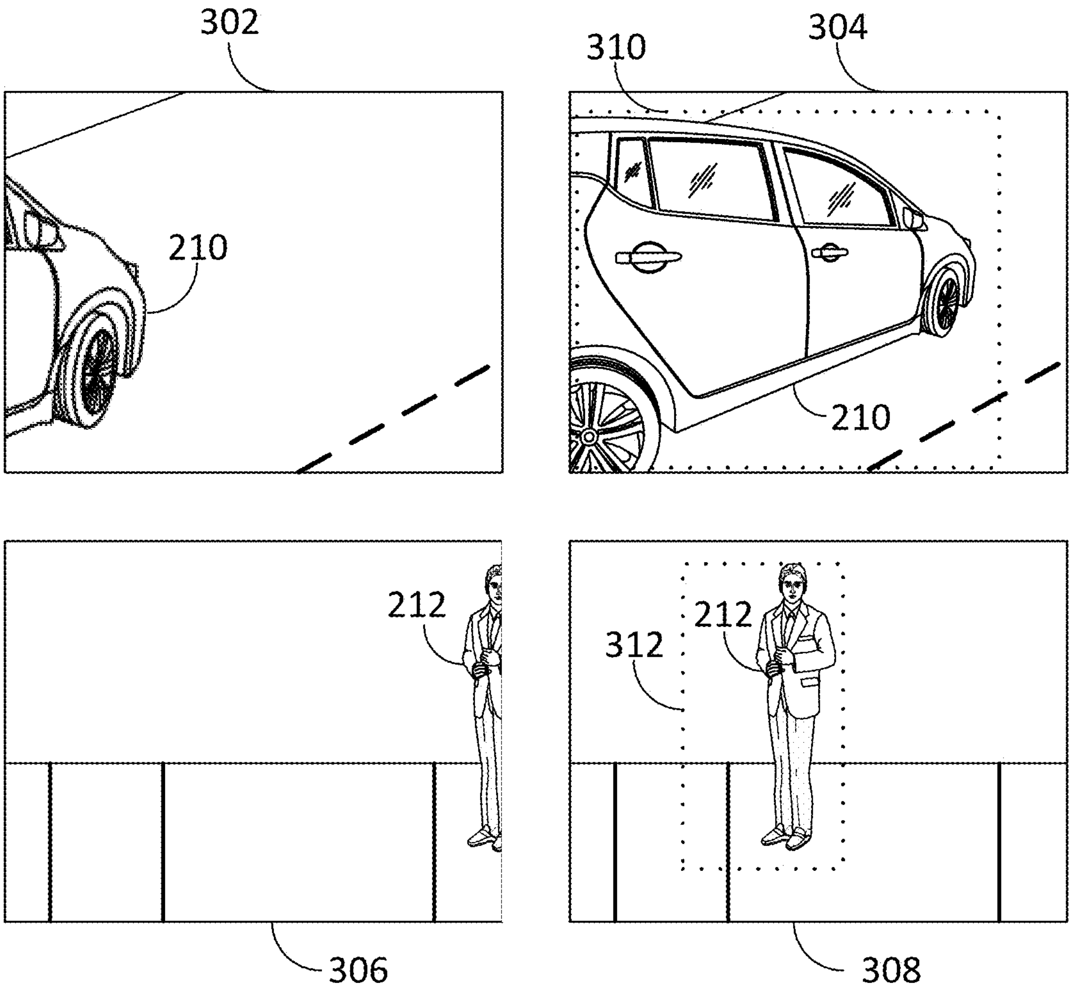
FIG. 3 shows an illustrative diagram of data collected by vehicles that may be used to complete tasks, in accordance with embodiments of the disclosure.

FIG. 3 shows illustrative diagrams of data collected by vehicles that may be used to complete tasks, in accordance with embodiments of the disclosure. FIG. 3 shows a first image 302, a second image 304, a third image 306, and a fourth image 308. In some embodiments, the first image 302 and the second image 304 are captured by a first camera (e.g., first camera 204) and the third image 306 and the fourth image 308 are captured by a second camera (e.g., second camera 206). In some embodiments, the images are captured at different times. For example, the first image 302 and/or the third image 306 are captured at a first time and second image 304 and/or the fourth image 308 are captured at a second time. The first time may be before or after the second time.

In some embodiments, the agent uses one or more image processing algorithms and/or characteristics related to the task to determine if one or more of the images correspond to the task. For example, the agent may use an image processing algorithm to detect that the second image 304 comprises a depiction 310 of a second vehicle 210. The agent may compare one or more characteristics (e.g., make, model, color, year, license plate number, etc.) of the identified depiction 310 with characteristics associated with the task. If the agent determines that one or more characteristics of the depiction 310 correspond to one or more characteristics associated with the task then the agent may transmit the second image 304 to one or more servers. In another example, the agent may use an image processing algorithm to detect that the fourth image 308 comprises a depiction 312 of a person 212. The agent may compare one or more characteristics (e.g., age, ethnicity, gender, height, weight, etc.) of the identified depiction 312 with characteristics associated with the task. If the agent determines that one or more characteristics of the depiction 312 correspond to one or more characteristics associated with the task then the agent may transmit the fourth image 308 to one or more servers.

Figure 4:
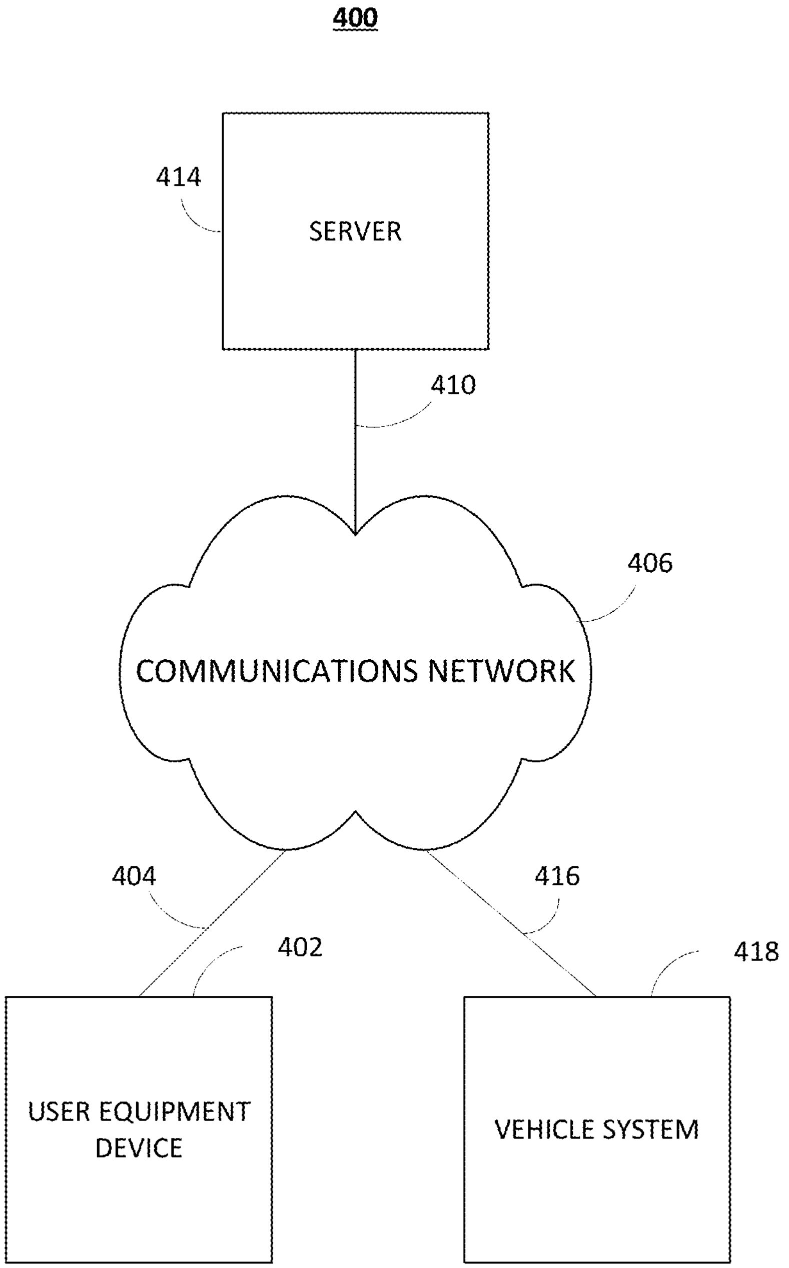
FIG. 4 shows an illustrative block diagram of a media system, in accordance with embodiments of the disclosure.
Figure 5:
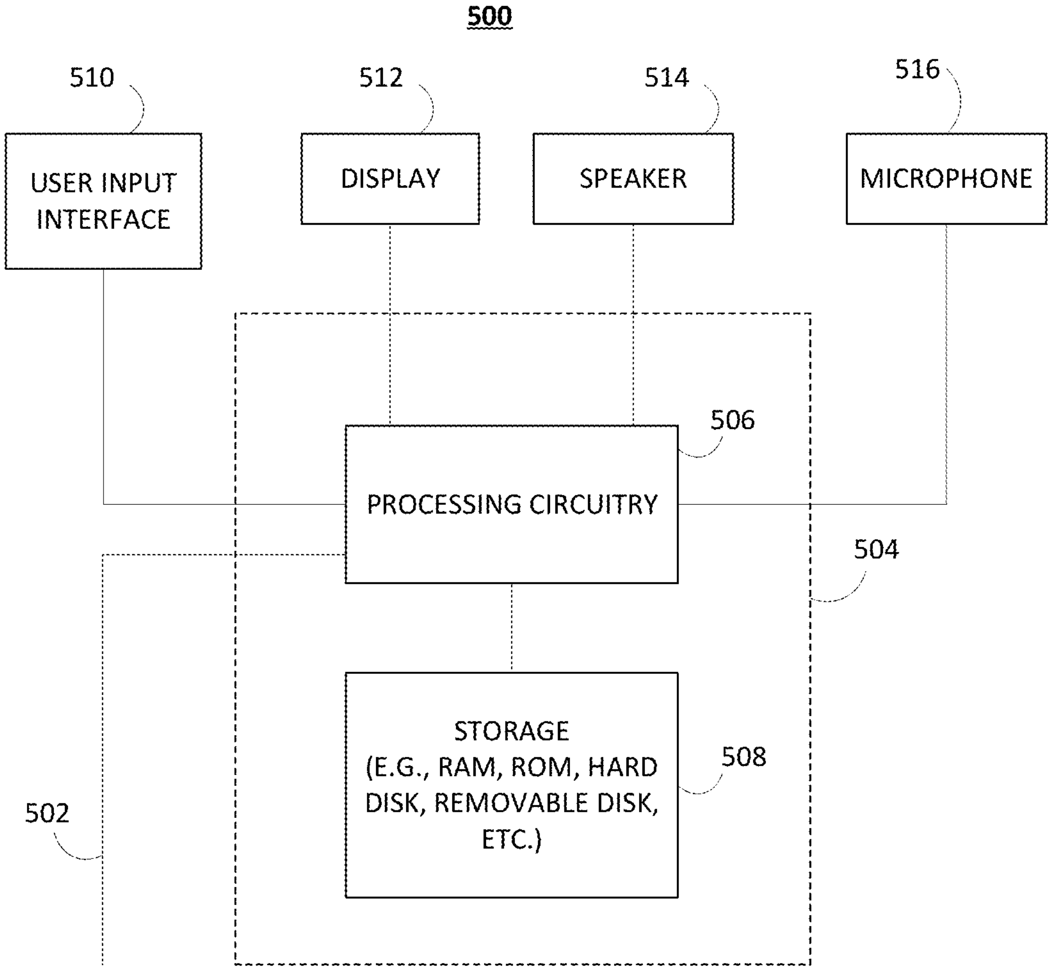
FIG. 5 shows an illustrative block diagram of a user equipment device system, in accordance with embodiments of the disclosure.
Figure 6:
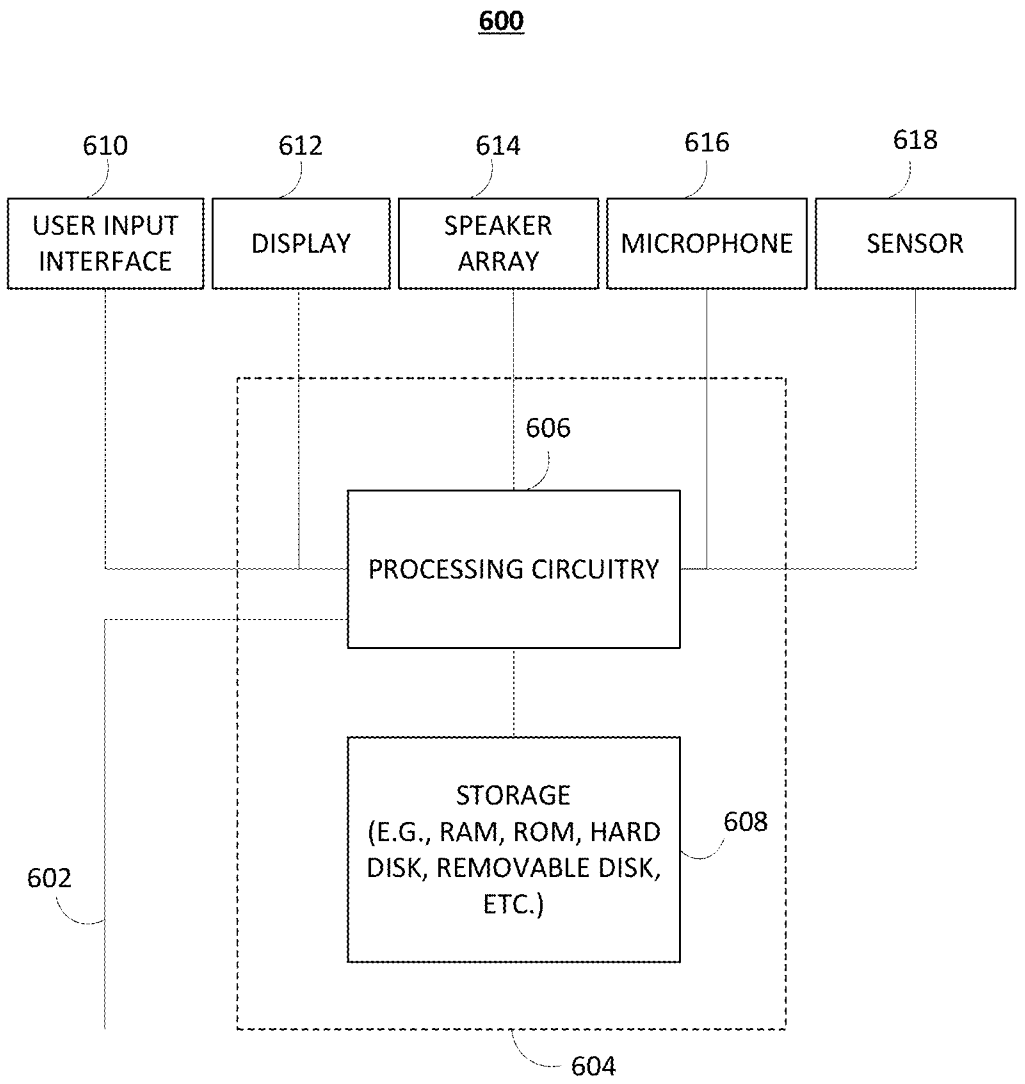
FIG. 6 shows an illustrative block diagram of a vehicle system, in accordance with embodiments of the disclosure.

FIGS. 4-6 describe example devices, systems, servers, and related hardware for using data collected by vehicles to complete tasks, in accordance with embodiments of the disclosure. In the system 400, there can be more than one user equipment device 402, but only one is shown in FIG. 4 to avoid overcomplicating the drawing. In addition, a user may utilize more than one type of user equipment device and more than one of each type of user equipment device. In an embodiment, there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. In an embodiment, the user equipment devices may also communicate with each other directly through an indirect path via the communications network 406.

The system 400 may also comprise more than one vehicle systems 418, but only one is shown in FIG. 4 to avoid overcomplicating the drawing. The user equipment devices and/or vehicle systems may be coupled to communications network 406. Namely, the user equipment device 402 is coupled to the communications network 406 via communications path 404 and the vehicle system 418 is coupled to the communications network 406 via communications path 416. The communications network 406 may be one or more networks including the Internet, a mobile phone network, mobile voice or data network (e.g., a 5G or LTE network), cable network, public switched telephone network, or other types of communications network or combinations of communications networks. The communications network 406 may be connected to a server 414 through a third path 410. The paths may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment, the paths may be wireless paths.

The system 400 also includes a server 414, which can be coupled to any number of databases (e.g., agent database, task identifier database, vehicle identifier database, etc.) providing information to the user equipment devices and/or vehicle systems. The server 414 may store and execute various software modules to implement the providing of personalized audio for different users in a vehicle functionality.

FIG. 5 shows a generalized embodiment of a user equipment device 500, in accordance with some embodiments. In an embodiment, the user equipment device 500 is the same user equipment device 402 of FIG. 4. The user equipment device 500 may receive content and data via input/output (I/O) path 502. The I/O path 502 may provide content (e.g., broadcast programming, on-demand programming, Internet content, content available over a local area network (LAN) or wide area network (WAN), and/or other content) and data to control circuitry 504, which includes processing circuitry 506 and a storage 508. The control circuitry 504 may be used to send and receive commands, requests, and other suitable data using the I/O path 502. The I/O path 502 may connect the control circuitry 504 (and specifically the processing circuitry 506) to one or more communications paths. I/O functions may be provided by one or more of these communications paths but are shown as a single path in FIG. 5 to avoid overcomplicating the drawing.

The control circuitry 504 may be based on any suitable processing circuitry such as the processing circuitry 506. As referred to herein, processing circuitry 506 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The using of data collected by vehicles to complete tasks functionality can be at least partially implemented using the control circuitry 504. The using of data collected by vehicles to complete tasks functionality described herein may be implemented in or supported by any suitable software, hardware, or combination thereof. The using of data collected by vehicles to complete tasks functionality can be implemented on the user equipment, on remote servers, or across both.

In client/server-based embodiments, the control circuitry 504 may include communications circuitry suitable for communicating with one or more servers and/or vehicle systems that may at least implement the described using of data collected by vehicles to complete tasks functionality. The instructions for carrying out the above-mentioned functionality may be stored on one or more vehicle systems and/or one or more servers. Communications circuitry may include a cable modem, an integrated service digital network (ISDN) modem, a digital subscriber line (DSL) modem, a telephone modem, an Ethernet card, a radio (e.g., UWB radio), a wireless modem for communications with other equipment, and/or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 508 that is part of the control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid-state devices, quantum storage devices, gaming consoles, gaming media, or any other suitable fixed or removable storage devices, and/or any combination of the same. The storage 508 may also store any number of databases (e.g., agent database, task identifier database, vehicle identifier database, etc.). The storage 508 may be used to store various types of content described herein. Nonvolatile memory may also be used (e.g., to launch a boot-up routine and other instructions). Cloud-based storage may be used to supplement the storage 508 or instead of the storage 508.

The control circuitry 504 may include audio generating circuitry and tuning circuitry, such as one or more analog tuners, audio generation circuitry, filters or any other suitable tuning or audio circuits or combinations of such circuits. The control circuitry 504 may also include scaler circuitry for upconverting and down converting content into the preferred output format of the user equipment device 500. The control circuitry 504 may also include digital-to-analog converter circuitry and analog-to-digital converter circuitry for converting between digital and analog signals. The tuning and encoding circuitry may be used by the user equipment device 500 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 508 is provided as a separate device from the user equipment device 500, the tuning and encoding circuitry (including multiple tuners) may be associated with the storage 508.

The user may utter instructions to the control circuitry 504, which are received by the microphone 516. The microphone 516 may be any microphone (or microphones) capable of detecting human speech. The microphone 516 is connected to the processing circuitry 506 to transmit detected voice commands and other speech thereto for processing.

The user equipment device 500 may optionally include an interface 510. The interface 510 may be any suitable user interface, such as a remote control, mouse, trackball, keypad, keyboard, touchscreen, touchpad, stylus input, joystick, or other user input interfaces. A display 512 may be provided as a stand-alone device or integrated with other elements of the user equipment device 500. For example, the display 512 may be a touchscreen or touch-sensitive display. In such circumstances, the interface 510 may be integrated with or combined with the microphone 516. When the interface 510 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 510 may be HDTV-capable. In some embodiments, the display 512 may be a 3D display.

The speakers 514 may be integrated with other elements of user equipment device 500 or may be one or more stand-alone units. In some embodiments, the speakers 514 may be dynamic speakers, planar magnetic speakers, electrostatic speakers, horn speakers, subwoofers, tweeters, and/or similar such speakers. In some embodiments, the control circuitry 504 outputs one or more audio signals to the speakers 514.

FIG. 6 shows a generalized embodiment of a vehicle system 600, in accordance with some embodiments. In an embodiment, the vehicle system 600 is the same vehicle system 418 of FIG. 4. The vehicle system 600 may receive content and data via I/O path 602. The I/O path 602 may provide content (e.g., broadcast programming, on-demand programming, Internet content, content available over a LAN or WAN, and/or other content) and data to control circuitry 604, which includes processing circuitry 606 and a storage 608. The control circuitry 604 may be used to send and receive commands, requests, and other suitable data using the I/O path 602. The I/O path 602 may connect the control circuitry 604 (and specifically the processing circuitry 606) to one or more communications paths. I/O functions may be provided by one or more of these communications paths but are shown as a single path in FIG. 6 to avoid overcomplicating the drawing.

The control circuitry 604 may be based on any suitable processing circuitry such as the processing circuitry 606. As referred to herein, processing circuitry 606 should be understood to mean circuitry based on one or more microprocessors, microcontrollers, digital signal processors, programmable logic devices, FPGAs, ASICs, etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The using of data collected by vehicles to complete tasks functionality can be at least partially implemented using the control circuitry 604. The using of data collected by vehicles to complete tasks functionality described herein may be implemented in or supported by any suitable software, hardware, or combination thereof. The using of data collected by vehicles to complete tasks functionality can be implemented on the vehicle system 600, user equipment, and/or on remote servers.

In client/server-based embodiments, the control circuitry 604 may include communications circuitry suitable for communicating with one or more user equipment devices and/or one or more servers that may at least implement the described using of data collected by vehicles to complete tasks functionality. The instructions for carrying out the above-mentioned functionality may be stored on one or more user equipment devices and/or one or more servers. Communications circuitry may include a cable modem, an ISDN modem, a DSL modem, a telephone modem, an Ethernet card, a radio (e.g., UWB radio), a wireless modem for communications with other equipment, and/or any other suitable communications circuitry. Such communications may involve the Internet or any other suitable communications networks or paths. In addition, communications circuitry may include circuitry that enables peer-to-peer communication of vehicle systems, or communication of vehicle systems in locations remote from each other.

Memory may be an electronic storage device provided as the storage 608 that is part of the control circuitry 604. As mentioned, "electronic storage device" or "storage device" can be understood to mean any device for storing electronic data, computer software, or firmware, such as random-access memory, read-only memory, hard drives, optical drives, DVD recorders, CD recorders, BD recorders, BLU-RAY 3D disc recorders, DVRs, solid-state devices, quantum storage devices, gaming consoles, gaming media, or any other suitable fixed or removable storage devices, and/or any combination of the same. The storage 608 may also store any number of databases (e.g., agent database, task identifier database, vehicle identifier database, etc.). The storage 608 may be used to store various types of agents described herein. Nonvolatile memory may also be used (e.g., to launch a boot-up routine and other instructions). Cloud-based storage may be used to supplement the storage 608 or instead of the storage 608.

The control circuitry 604 may include audio generating circuitry and tuning circuitry, such as one or more analog tuners, audio generation circuitry, filters or any other suitable tuning or audio circuits or combinations of such circuits. The control circuitry 604 may also include scaler circuitry for upconverting and down converting content into the preferred output format of the vehicle system 600. The control circuitry 604 may also include digital-to-analog converter circuitry and analog-to-digital converter circuitry for converting between digital and analog signals. The tuning and encoding circuitry may be used by the vehicle system 600 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 608 is provided as a separate device from the vehicle system 600, the tuning and encoding circuitry (including multiple tuners) may be associated with the storage 608.

The user may utter instructions to the control circuitry 604, which are received by the microphone 616. The microphone 616 may comprise one or more microphones capable of detecting human speech. The microphone 616 is connected to the processing circuitry 606 to transmit detected voice commands and other speech thereto for processing.

The vehicle system 600 may optionally include an interface 610. The interface 610 may be any suitable user interface, such as a remote control, mouse, trackball, keypad, keyboard, touchscreen, touchpad, stylus input, joystick, or other user input interfaces. A display 612 may be provided as a stand-alone device or integrated with other elements of the vehicle system 600. For example, the display 612 may be a touchscreen or touch-sensitive display. When the interface 610 is configured with a screen, such a screen may be one or more of a monitor, a television, an LCD, active matrix display, cathode ray tube display, light-emitting diode display, organic light-emitting diode display, quantum dot display, or any other suitable equipment for displaying visual images. In some embodiments, the interface 610 may be HDTV-capable. In some embodiments, the display 612 may be a 3D display.

The vehicle system 600 includes at least one sensor 618. The sensor 618 may be one or more image (e.g., optical) sensors, depth sensors, ultra sonic sensors, Infrared (IR) cameras, Red Green Blue (RGB) cameras, Passive IR (PIR) cameras, heat IR sensors, tension sensors, pressure sensors, audio sensors and/or any combination thereof.

The speaker array 614 may be integrated with other elements of vehicle system 600 or may be one or more stand-alone units. In some embodiments, the speaker array 614 may be dynamic speakers, planar magnetic speakers, electrostatic speakers, horn speakers, subwoofers, tweeters, and/or similar such speakers. In some embodiments, the control circuitry 604 outputs one or more audio signals to the speaker array 614. In some embodiments, one or more speakers of the speaker array 614 receive and output a unique audio signal. In some embodiments, one or more speakers of the speaker array 614 receive and output the same audio signal. In some embodiments, one or more speakers of the speaker array 614 can change positions and/or orientations.

Figure 7:
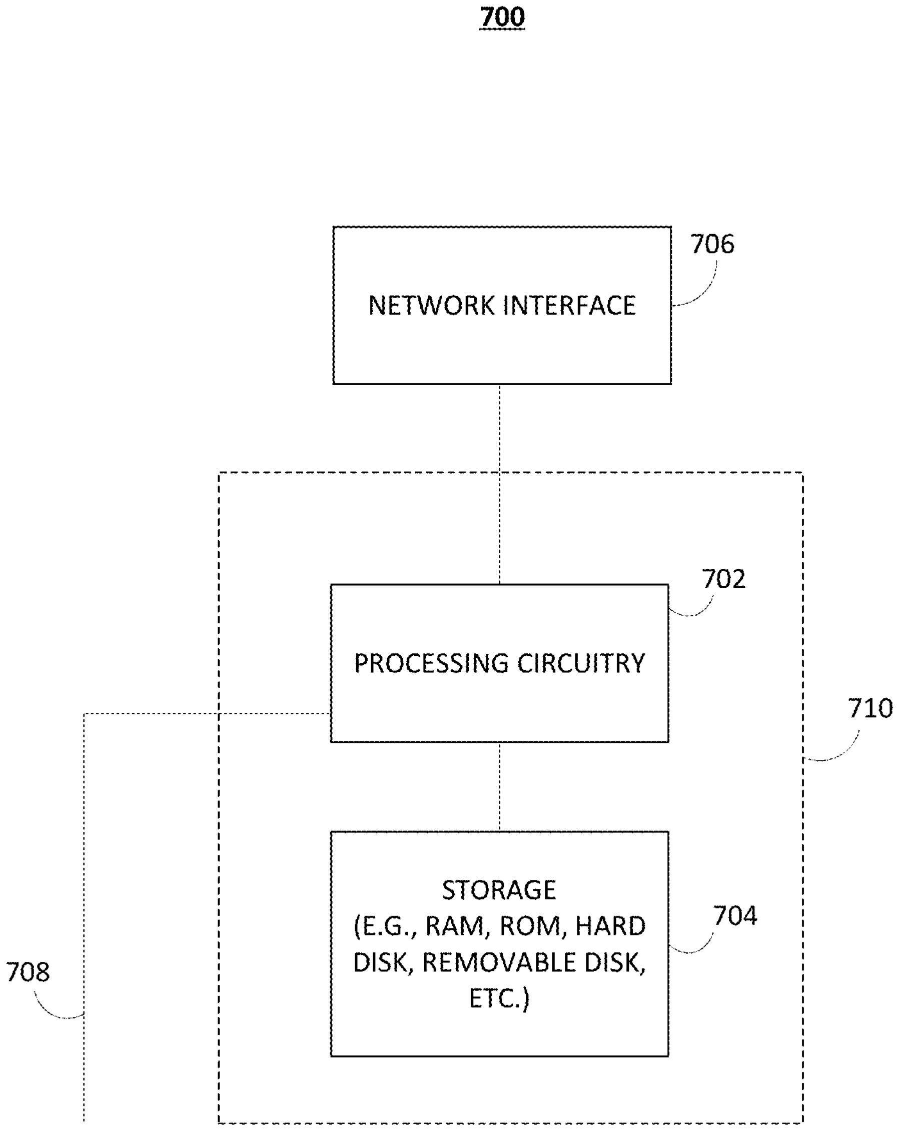
FIG. 7 shows an illustrative block diagram of a server system, in accordance with embodiments of the disclosure.

FIG. 7 shows an illustrative block diagram of a server system 700, in accordance with some embodiments of the disclosure. Server system 700 may include one or more computer systems (e.g., computing devices), such as a desktop computer, a laptop computer, and a tablet computer. In some embodiments, the server system 700 is a data server that hosts one or more databases (e.g., agent database, task identifier database, vehicle identifier database, etc.), models, or modules or may provide various executable applications or modules. In practice, and as recognized by those of ordinary skill in the art, items shown separately could be combined and some items could be separated. In some embodiments, not all shown items must be included in server system 700. In some embodiments, server system 700 may comprise additional items.

The server system 700 can include processing circuitry 702 that includes one or more processing units (processors or cores), storage 704, one or more network or other communications network interfaces 706, and one or more I/O paths 708. I/O paths 708 may use communication buses for interconnecting the described components. I/O paths 708 can include circuitry (sometimes called a chipset) that interconnects and controls communications between system components. Server system 700 may receive content and data via I/O paths 708. The I/O path 708 may provide data to control circuitry 710, which includes processing circuitry 702 and a storage 704. The control circuitry 710 may be used to send and receive commands, requests, and other suitable data using the I/O path 708. The I/O path 708 may connect the control circuitry 710 (and specifically the processing circuitry 702) to one or more communications paths. I/O functions may be provided by one or more of these communications paths but are shown as a single path in FIG. 7 to avoid overcomplicating the drawing.

The control circuitry 710 may be based on any suitable processing circuitry such as the processing circuitry 702. As referred to herein, processing circuitry should be understood to mean circuitry based on one or more microprocessors, microcontrollers, digital signal processors, programmable logic devices, FPGAs, ASICs, etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Memory may be an electronic storage device provided as the storage 704 that is part of the control circuitry 710. Storage 704 may include random-access memory, read-only memory, high-speed random-access memory (e.g., DRAM, SRAM, DDR RAM, or other random-access solid-state memory devices), non-volatile memory, one or more magnetic disk storage devices, optical disk storage devices, flash memory devices, other non-volatile solid-state storage devices, quantum storage devices, and/or any combination of the same.

In some embodiments, storage 704 or the computer-readable storage medium of the storage 704 stores an operating system, which includes procedures for handling various basic system services and for performing hardware dependent tasks. In some embodiments, storage 704 or the computer-readable storage medium of the storage 704 stores a communications module, which is used for connecting the server system 700 to other computers and devices via the one or more communication network interfaces 706 (wired or wireless), such as the internet, other wide area networks, local area networks, metropolitan area networks, and so on. In some embodiments, storage 704 or the computer-readable storage medium of the storage 704 stores a web browser (or other application capable of displaying web pages), which enables a user to communicate over a network with remote computers or devices. In some embodiments, storage 704 or the computer-readable storage medium of the storage 704 stores a database for agent identification, task identification, vehicle identification, and/or similar such information.

In some embodiments, executable modules, applications, or sets of procedures may be stored in one or more of the previously mentioned memory devices and corresponds to a set of instructions for performing a function described above. In some embodiments, modules or programs (i.e., sets of instructions) need not be implemented as separate software programs, procedures, or modules, and thus various subsets of modules may be combined or otherwise re-arranged in various implementations. In some embodiments, the storage 704 stores a subset of the modules and data structures identified above. In some embodiments, the storage 704 may store additional modules or data structures not described above.

Figure 8:
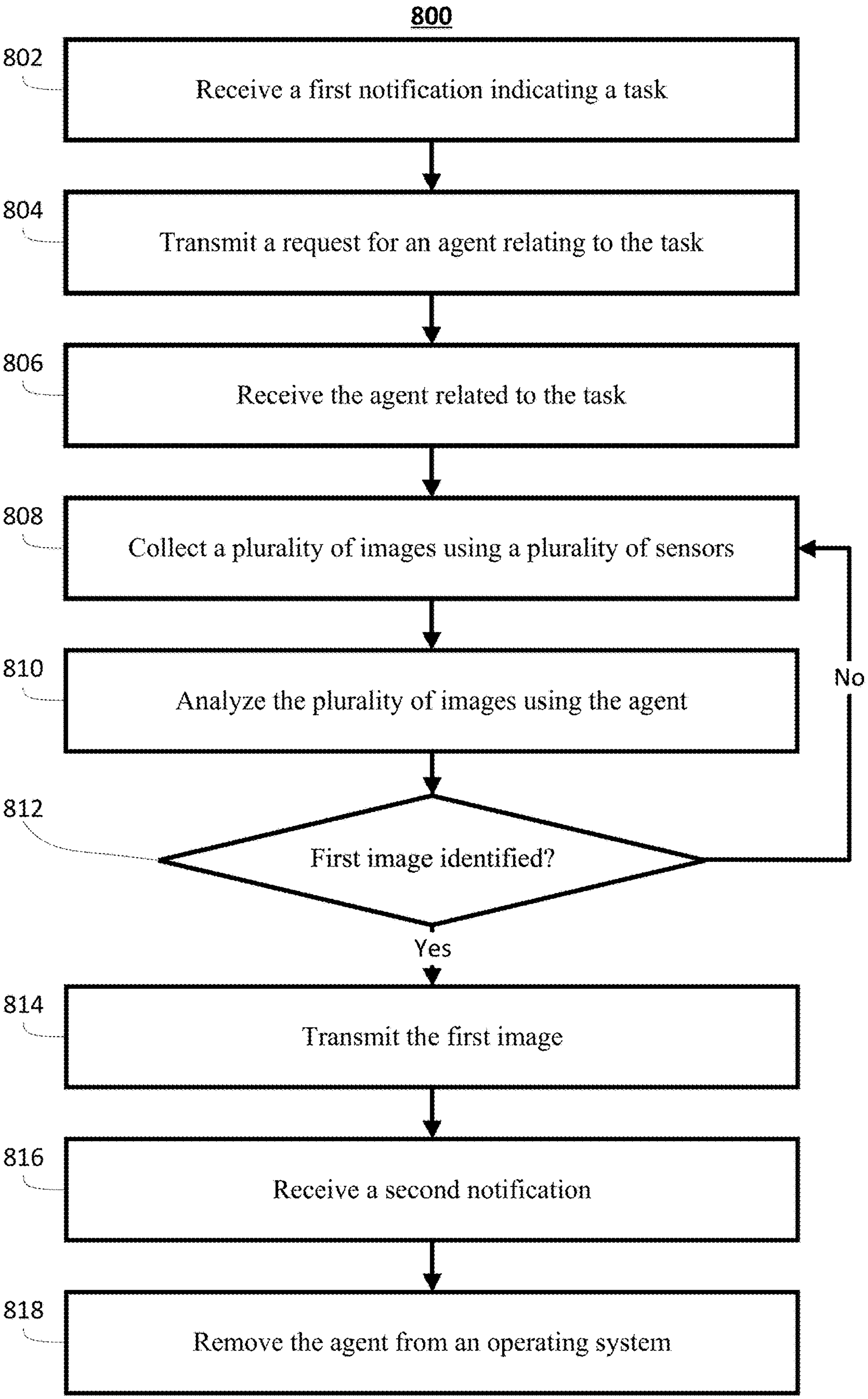
FIG. 8 shows an illustrative flowchart of a process for using data collected by vehicles to complete tasks, in accordance with embodiments of the disclosure.

FIG. 8 is an illustrative flowchart of a process 800 for using data collected by vehicles to complete tasks, in accordance with embodiments of the disclosure. Process 800, and any of the following processes, may be executed by control circuitry 504 on a user equipment device 500, by control circuitry 604 of the vehicle system 600, and/or by control circuitry 710 of the server system 700. In some embodiments, control circuitry may be part of a remote server separated from the user equipment device 500 and/or vehicle system 600 by way of a communications network or distributed over a combination of both. In some embodiments, instructions for executing process 800 may be encoded onto a non-transitory storage medium (e.g., the storage 508, the storage 608, the storage 704) as a set of instructions to be decoded and executed by processing circuitry (e.g., the processing circuitry 506, the processing circuitry 606, the processing circuitry 702). Processing circuitry may, in turn, provide instructions to other sub-circuits contained within control circuitry, such as the encoding, decoding, encrypting, decrypting, scaling, analog/digital conversion circuitry, and the like. It should be noted that the process 800, or any step thereof, could be performed on, or provided by, any of the devices shown in FIGS. 1, and/or 4-7. Although the process 800 is illustrated as described as a sequence of steps, it is contemplated that various embodiments of process 800 may be performed in any order or combination and need not include all the illustrated steps.

At 802, control circuitry receives a first notification indicating a task. For example, the first notification may indicate a task of obtaining data related to a missing vehicle. In another example, the first notification may indicate a task of obtaining data related to a missing person or animal. In some embodiments, the first notification also comprises a task identifier related to the task. In some embodiments, the control circuitry receives the first notification from one or more servers (e.g., server 104). In some embodiments, the first notification comprises a location identifier (e.g., URL, file location, etc.) corresponding to a location to request an agent related to the task.

At 804, control circuitry transmits a request for an agent relating to the task. The request may comprise one or more identifiers (e.g., task identifier) related to the first notification. In some embodiments, the request also comprises one or more identifiers (e.g., make, model, vehicle operating software type, etc.) related to the control circuitry. In some embodiments, the control circuitry requests the agent relating to the task from one or more servers (e.g., server 104). In some embodiments, the control circuitry requests the agent using a location identifier received at step 802. For example, the control circuitry may receive a location identifier associated with a first database. The control circuitry may request the agent from the first database.

At 806, control circuitry receives an agent related to the task. In some embodiments, the control circuitry receives the agent from one or more servers (e.g., server 104) and/or one or more databases. In some embodiments, one or more devices generate the agent based on the task using any of the methodologies described herein.

At 808, control circuitry collects a plurality of images using a plurality of sensors. The control circuitry may collect the plurality of images using optical sensors, depth sensors, ultra sonic sensors, IR cameras, RGB cameras, PIR cameras, heat IR sensors, tension sensors, audio sensors, and/or similar such sensors. For example, the control circuitry may receive the plurality of images from a camera attached to a windshield of a vehicle. In some embodiments, the control circuitry collects the plurality of images using the same or similar methodologies used during normal operation.

At 810, control circuitry analyzes the plurality of images using the agent. The agent may use one or more programs/algorithms/models to analyze the plurality of images. For example, the agent may use an OCR program to detect license plate numbers depicted in the plurality of images. In another example, the agent may use an image processing algorithm to detect people depicted in the plurality of images.

At 812, control circuitry determines whether a first image is identified. In some embodiments, the control circuitry uses the agent to determine whether any of the images of the plurality of images correspond to the task. For example, the control circuitry may use an agent comprising an OCR program and characteristics (e.g., license plate) associated with the task (e.g., obtain image related to a missing vehicle) to determine that the first image (e.g., an image comprising a depiction of the missing vehicle) corresponds to the task. In another example, the control circuitry may use an image processing algorithm and characteristics (e.g., height, weight, gender, age, etc.) associated with the task (e.g., obtain image related to a missing person) to determine that the first image (e.g., an image comprising a depiction of the missing person) corresponds to the task. If the control circuitry determines that a first image is identified, then the process 800 continues to step 814. If the control circuitry determines that a first image is not identified, then the process 800 returns to step 808.

At 814, control circuitry transmits the first image. In some embodiments, the control circuitry transmits the first image to one or more servers (e.g., server 104). In some embodiments, the control circuitry also communicates metadata related to the first image. For example, the metadata may include time of day, location, and/or similar such information related to when the first image was captured.

At 816, control circuitry receives a second notification. In some embodiments, the control circuitry receives the second notification from one or more servers (e.g., server 104). In some embodiments, the control circuitry may repeat steps 808-814, until the task is completed. For example, the control circuitry may repeat steps 808-814, until the control circuitry receives the second notification at step 816. At 818, control circuitry removes the agent from the operating system.

Figure 9:
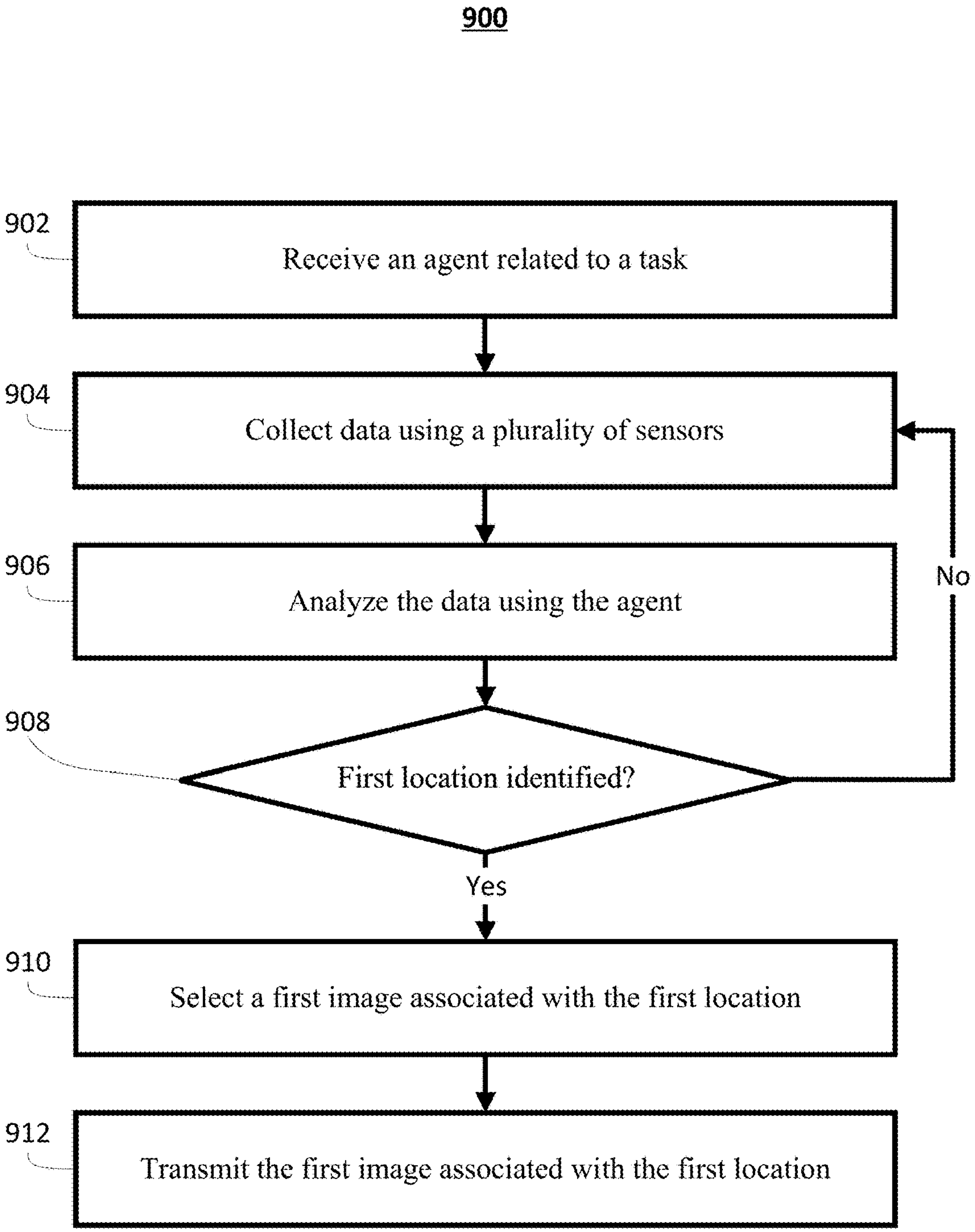
FIG. 9 shows an illustrative flowchart of another process for using data collected by vehicles to complete tasks, in accordance with embodiments of the disclosure.

FIG. 9 shows an illustrative flowchart of another process 900 for using data collected by vehicles to complete tasks, in accordance with embodiments of the disclosure.

At 902, control circuitry receives an agent related to a task. In some embodiments, the control circuitry receives the agent from one or more servers (e.g., server 104) and/or one or more databases. In some embodiments, one or more devices generate the agent based on the task using any of the methodologies described herein. In some embodiments, the control circuitry receives the agent in response to transmitting one or more requests. For example, the control circuitry may transmit a request for an agent relating to the task using the same or similar methodologies described at step 804.

At 904, control circuitry collects data using a plurality of sensors. The control circuitry may collect the data using optical sensors, depth sensors, ultra sonic sensors, IR cameras, RGB cameras, PIR cameras, heat IR sensors, tension sensors, audio sensors, global positing systems (GPS) and/or similar such sensors. For example, the control circuitry may receive the plurality of images from a camera attached to a windshield of a vehicle. In another example, the control circuitry may collect GPS data from a GPS associated with the control circuitry. In some embodiments, the control circuitry collects the plurality of images and/or GPS data using the same or similar methodologies used during normal operation.

At 906, control circuitry analyzes the data using the agent. For example, the agent may use an image processing algorithm to detect a gas station depicted in a plurality of images to determine that the control circuitry is located near a gas station. In another example, the agent may use GPS data to determine that the control circuitry is located at a first delivery location.

At 908, control circuitry determines whether the location is identified using the data. In some embodiments, the location is related to the task. For example, the task may be to obtain images of a delivered item and the location may correspond to one or more delivery locations for the items. In another example, the task may be to obtain pictures of gas price data and the location may correspond to one or more gas stations. The control circuitry may use the agent to determine if the location corresponding to the task is identified. For example, the control circuitry may use an agent comprising an image processing algorithm to detect that a first image depicts a gas station. Based on the agent detecting that the first image depicts a gas station, the control circuitry may determine that the location (e.g., gas station) is identified. In another example, the control circuity may use the agent to determine if GPS data associated with the control circuitry corresponds to coordinates of one or more delivery locations. Based on the agent detecting that GPS data associated with the control circuitry corresponds to coordinates of one or more delivery locations, the control circuitry may determine that the location (e.g., delivery location) is identified. If the control circuitry determines that the location is identified using the data, then the process 900 continues to step 910. If the control circuitry determines that the location is not identified using the data, then the process 900 returns to step 904.

At 910, control circuitry selects a first image associated with the first location. For example, the control circuitry may select a first image depicting a gas station. In another example, the control circuitry may select one or more images taken by a camera when the GPS data associated with the control circuitry corresponds to coordinates of one or more delivery locations.

At 912, control circuitry transmits the first image associated with the first location. In some embodiments, the control circuitry transmits the first image to one or more servers (e.g., server 104). In some embodiments, the control circuitry also communicates metadata related to the first image. For example, the metadata may include time of day, location, and/or similar such information related to when the first image was captured.

Figure 10:
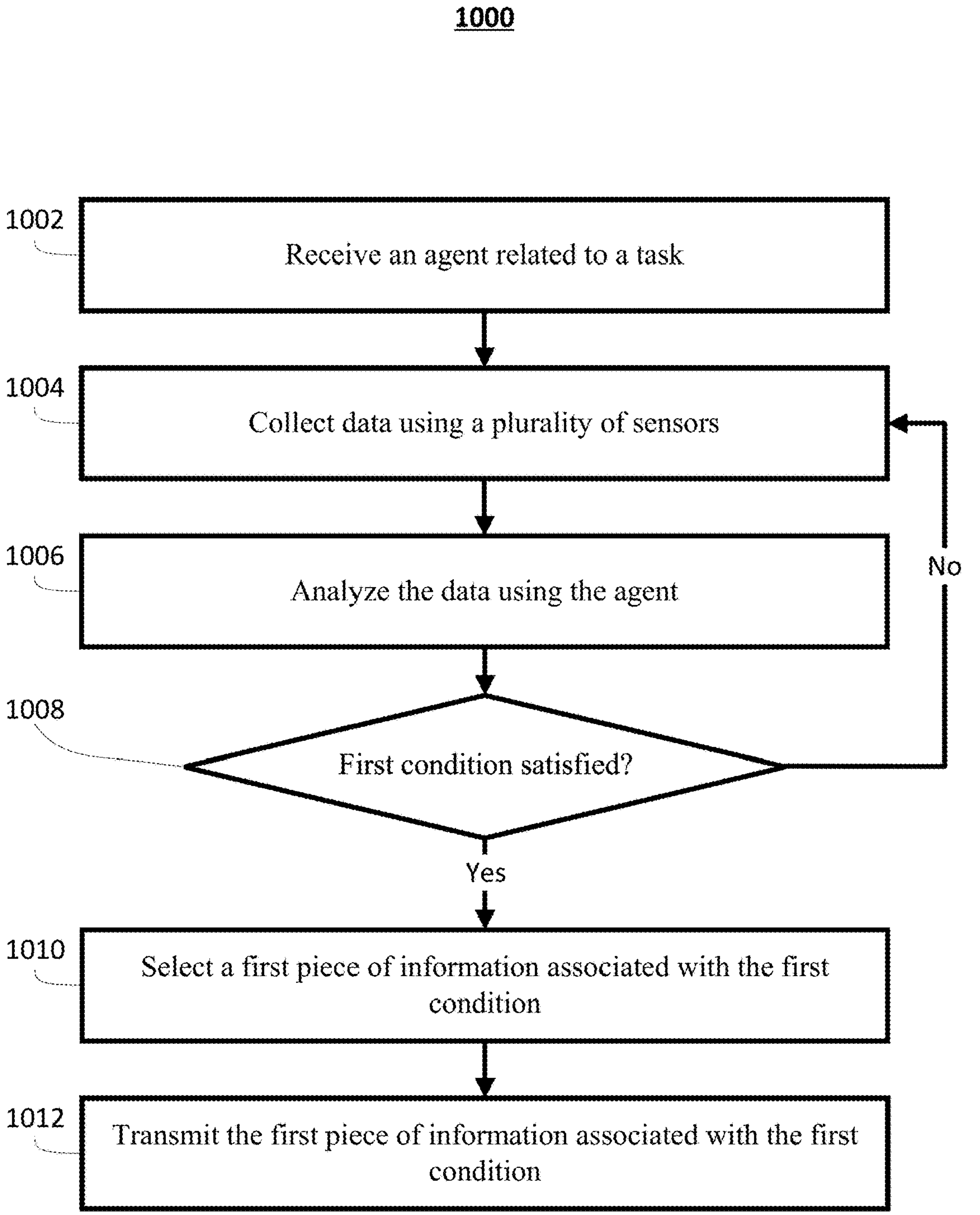
FIG. 10 shows an illustrative flowchart of another process for using data collected by vehicles to complete tasks, in accordance with embodiments of the disclosure.

FIG. 10 shows an illustrative flowchart of another process 900 for using data collected by vehicles to complete tasks, in accordance with embodiments of the disclosure.

At 1002, control circuitry receives an agent related to the task. In some embodiments, the control circuitry receives the agent from one or more servers (e.g., server 104) and/or one or more databases. In some embodiments, one or more devices generate the agent based on the task using any of the methodologies described herein. In some embodiments, the control circuitry receives the agent in response to transmitting one or more requests. For example, the control circuitry may transmit a request for an agent relating to the task using the same or similar methodologies described at step 804.

At 1004, control circuitry collects data using a plurality of sensors. The control circuitry may collect the data using optical sensors, depth sensors, ultra sonic sensors, IR cameras, RGB cameras, PIR cameras, heat IR sensors, tension sensors, audio sensors, global positing systems, accelerometers, brake pedal detectors, gas pedal detectors, steering wheel sensors, seat belt sensors, airbag sensor, and/or similar such sensors. For example, the control circuitry may receive a video from a camera attached to a windshield of a vehicle. In another example, the control circuitry may collect accelerometer data. In some embodiments, the control circuitry collects the data using the same or similar methodologies used during normal operation.

At 1006, control circuitry analyzes the data using the agent. For example, the agent may use one or more algorithms to detect a car accident using acceleration data. In another example, the agent may use GPS data to determine that the control circuitry is located a first distance away from a user.

At 1008, control circuitry determines whether the condition is satisfied using the data. In some embodiments, the conditions correspond to the task. For example, a condition may be accelerometer data exceeding a threshold. In another example, a condition may be the activation of the airbag sensor. In another example, the condition may be when the position of the control circuitry is within a threshold distance (e.g., 150 feet) of a user. In another example, the condition may be when a threshold time (e.g., ten minutes) has elapsed since a user has requested a ride using a rideshare app. If the control circuitry determines that the condition is satisfied using the data, then the process 1000 continues to step 1010. If the control circuitry determines that the condition is not satisfied using the data, then the process 1000 returns to step 1004.

At 1010, control circuitry selects a first piece of information associated with the first condition. For example, when the agents detects acceleration data that exceeds a threshold, then the agent may determine that a car accident has occurred and select a first piece of information (e.g., image, acceleration data, impact sensor data, velocity data, brake pedal data, gas pedal data, steering wheel data, seat belt tension data, etc.) generated before, during, and/or after the detection of the car accident. In another example, the agent may use GPS data to determine that the control circuitry is within a threshold distance (e.g., 150 feet) of a rideshare user and then the agent may select a first piece of information (e.g., a portion of video captured by a dashboard camera). In another example, the agent may determine that a threshold time (e.g., ten minutes) has elapsed since a rideshare user has requested a ride using a rideshare application, then the agent may select a first piece of information (e.g., the GPS coordinates of the vehicle system).

At 1012, control circuitry transmits the first piece of information associated with the first condition. In some embodiments, the control circuitry transmits the first piece of information to one or more servers (e.g., server 104). In some embodiments, the control circuitry also communicates metadata related to the first piece of information. For example, the metadata may include time of day, location, and/or similar such information related to when the first piece information was recorded.

It is contemplated that some suitable steps or suitable descriptions of FIGS. 8-10 may be used with other suitable embodiments of this disclosure. In addition, some suitable steps and descriptions described in relation to FIGS. 8-10 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1-7 could be used to perform one or more of the steps in FIGS. 8-10.

The processes discussed above are intended to be illustrative and not limiting. For instance, the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving, by a server, a request for information related to a missing vehicle from a first device;

identifying, by the server, an agent associated with the request;

transmitting, by the server, a notification to a first vehicle indicating a task related to the request, wherein the first vehicle comprises a plurality of sensors;

in response to receiving the notification, requesting, by the first vehicle, the agent associated with the request;

receiving, by the first vehicle, the agent associated with the request;

collecting, by the first vehicle, a plurality of images using the plurality of sensors;

analyzing, by the first vehicle, the plurality of images using the agent;

identifying, by the first vehicle, a first image of the plurality of images using the agent associated with the request, wherein the first image comprises a depiction of the missing vehicle;

transmitting, by the first vehicle, the first image comprising the depiction of the missing vehicle to the server;

generating, by the server, a report comprising the first image comprising the depiction of the missing vehicle; and transmitting, by the server, the report to the first device.

2. The method of claim 1, wherein the first device is associated with an emergency service.

3. The method of claim 1, further comprising:

determining, by the server, that the task related to the request is completed based, at least in part, on generating the report comprising the first image comprising the depiction of the missing vehicle;

transmitting, by the server, a second notification to the first vehicle indicating that the task is complete; and removing, by the first vehicle, the agent from at least one memory of the first vehicle.

4. The method of claim 1, further comprising:

receiving, by the server, a second notification from the first device indicating that the task is complete;

determining, by the server, that the task related to the request is completed based, at least in part, on the second notification;

transmitting, by the server, a third notification to the first vehicle indicating that the task is complete; and removing, by the first vehicle, the agent from at least one memory of the first vehicle.

5. The method of claim 1, further comprising:

identifying, by the first vehicle, a second image of the plurality of images using the agent associated with the request, wherein the second image comprises an additional depiction of the missing vehicle; and transmitting, by the first vehicle, the second image comprising the additional depiction of the missing vehicle to the server, wherein the second image is included in the report.

6. The method of claim 1, further comprising confirming, by the server, that the first image comprising the depiction of the missing vehicle relates to the request prior to generating the report.

7. The method of claim 1, further comprising receiving registration information from the first vehicle prior to receiving the request for information related to the missing vehicle from the first device, wherein the registration information comprises an attribute associated with the first vehicle.

8. The method of claim 1, further comprising:

collecting, by the first vehicle, a first piece of information associated with the first image comprising the depiction of the missing vehicle; and transmitting, by the first vehicle, the first piece of information associated with the first image to the server.

9. The method of claim 8, wherein the first image was collected by the first vehicle when the first vehicle was located in a first location and the first piece of information corresponds to the first location.

10. The method of claim 8, wherein the first image was collected by the first vehicle at a first time and the first piece of information corresponds to the first time.

11. An apparatus comprising:

control circuitry; and at least one memory including computer program code for one or more programs, the at least one memory and the computer program code configured to, with the control circuitry, cause the apparatus to perform at least the following:

receive a request for information related to a missing vehicle from a first device;

identify an agent associated with the request;

transmit a notification to a first vehicle indicating a task related to the request, wherein the first vehicle comprises a plurality of sensors;

receive a second notification from the first vehicle, wherein the second notification requests the agent associated with the request;

transmit the agent associated with the request to the first vehicle, wherein transmitting the agent causes the first vehicle to:

analyze a plurality of images using the agent, wherein the plurality of images are collected by the first vehicle using the plurality of sensors; and identify a first image of the plurality of images using the agent, wherein the first image comprises a depiction of the missing vehicle;

receive the first image comprising the depiction of the missing vehicle from the first vehicle;

generate a report comprising the first image comprising the depiction of the missing vehicle; and transmit the report to the first device.

12. The apparatus of claim 11, wherein the first device is associated with an emergency service.

13. The apparatus of claim 11, wherein the apparatus is further caused to:

determine that the task related to the request is completed based, at least in part, on generating the report comprising the first image comprising the depiction of the missing vehicle; and transmit a third notification to the first vehicle indicating that the task is complete, wherein the third notification causes the first vehicle to remove the agent from at least one memory of the first vehicle.

14. The apparatus of claim 11, wherein the apparatus is further caused to:

receive a third notification from the first device indicating that the task is complete;

determine that the task related to the request is completed based, at least in part, on the third notification; and transmit a fourth notification to the first vehicle indicating that the task is complete, wherein the fourth notification causes the first vehicle to remove the agent from at least one memory of the first vehicle.

15. The apparatus of claim 11, wherein the apparatus is further caused to receive a second image from the first vehicle, wherein:

the second image comprises an additional depiction of the missing vehicle; and the second image is included in the report.

16. The apparatus of claim 11, wherein the apparatus is further caused to confirm that the first image comprising the depiction of the missing vehicle relates to the request prior to generating the report.

17. The apparatus of claim 11, wherein the apparatus is further caused to receive registration information from the first vehicle prior to receiving the request for information related to the missing vehicle from the first device, wherein the registration information comprises an attribute associated with the first vehicle.

18. The apparatus of claim 11, wherein the apparatus is further caused to receive a first piece of information associated with the first image from the first vehicle.

19. The apparatus of claim 18, wherein the first image was collected by the first vehicle when the first vehicle was located in a first location and the first piece of information corresponds to the first location.

20. The apparatus of claim 18, wherein the first image was collected by the first vehicle at a first time and the first piece of information corresponds to the first time.

* * * * *